United States Patent
Jung et al.

(10) Patent No.: US 9,151,998 B2
(45) Date of Patent: Oct. 6, 2015

(54) LIQUID CRYSTAL DISPLAY AND METHOD OF MANUFACTURING THE SAME

(71) Applicant: Samsung Display Co., Ltd., Yongin (KR)

(72) Inventors: Young-Min Jung, Asan-si (KR); HyeongJun Jin, Seoul (KR); Changwoo Kwon, Yongin-si (KR); Seunghee Oh, Goyang-si (KR); Kwangjae Kim, Asan-si (KR); Sangyeoul Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 111 days.

(21) Appl. No.: 13/910,678

(22) Filed: Jun. 5, 2013

(65) Prior Publication Data
US 2014/0211135 A1    Jul. 31, 2014

(30) Foreign Application Priority Data
Jan. 30, 2013    (KR) .................. 10-2013-0010587

(51) Int. Cl.
G02F 1/1333    (2006.01)
G02F 1/1362    (2006.01)
G02F 1/1337    (2006.01)

(52) U.S. Cl.
CPC .... G02F 1/136204 (2013.01); G02F 1/133788 (2013.01); G02F 2001/133388 (2013.01); G02F 2001/136218 (2013.01); G02F 2001/136254 (2013.01)

(58) Field of Classification Search
CPC ............... G02F 1/133788; G02F 1/133711; G02F 2001/13775; G02F 2001/133726; G02F 2001/133796; C09K 2019/548

USPC .......................................... 349/127, 134, 152
See application file for complete search history.

(56) References Cited

U.S. PATENT DOCUMENTS

| | | | |
|---|---|---|---|
| 6,683,671 B1 | 1/2004 | Morimoto | |
| 7,643,108 B2* | 1/2010 | Huang et al. | 349/152 |
| 7,768,583 B2 | 8/2010 | Kim | |
| 7,929,085 B2 | 4/2011 | Park et al. | |
| 2002/0089614 A1* | 7/2002 | Kim | 349/40 |
| 2008/0018848 A1* | 1/2008 | Iwato et al. | 349/153 |
| 2008/0055529 A1* | 3/2008 | Shirasaka et al. | 349/143 |
| 2008/0284970 A1 | 11/2008 | Ishitani | |
| 2010/0001965 A1 | 1/2010 | Wang et al. | |
| 2010/0103357 A1* | 4/2010 | Kye et al. | 349/123 |

(Continued)

FOREIGN PATENT DOCUMENTS

| | | |
|---|---|---|
| JP | 2010-049185 | 3/2010 |
| JP | 2010-145454 | 7/2010 |
| JP | 2011-221432 | 11/2011 |
| KR | 10-2007-0003165 | 1/2007 |
| KR | 10-2009-0038775 | 4/2009 |

*Primary Examiner* — Richard Kim
*Assistant Examiner* — Ryan Crockett
(74) *Attorney, Agent, or Firm* — H.C. Park & Associates, PLC

(57) ABSTRACT

A liquid crystal display includes a display area and a non-display area. The liquid crystal display includes a first base substrate, a pixel disposed on the first base substrate in the display area, a second base substrate, a common electrode disposed on the second base substrate, a liquid crystal layer disposed between the first base substrate and the second base substrate, and an electric field control line disposed on the first base substrate in the non-display area. The electric field control line is disposed on a same layer as the pixel electrode.

13 Claims, 7 Drawing Sheets

(56) References Cited

U.S. PATENT DOCUMENTS

2011/0221989 A1    9/2011  Lee et al.
2012/0153310 A1*   6/2012  Kwak .............................. 257/88
2012/0194494 A1    8/2012  Jung et al.
2014/0063431 A1*   3/2014  Shih et al. ...................... 349/153

* cited by examiner

LIQUID CRYSTAL DISPLAY AND METHOD OF MANUFACTURING THE SAME

CROSS REFERENCE TO RELATED APPLICATION

This application claims priority from and the benefit of Korean Patent Application No. 10-2013-0010587, filed on Jan. 30, 2013, which is hereby incorporated by reference for all purposes as if fully set forth herein.

BACKGROUND

1. Field

Exemplary embodiments of the invention relate to a liquid crystal display capable of reducing light leakage and a method of manufacturing the liquid crystal display.

2. Description of the Background

A liquid crystal display (LCD) may display an image by generating an electric field between two substrates to control an amount of light passing through a liquid crystal layer interposed between the two substrates.

A lower substrate of the two substrates may include a plurality of gate lines, a plurality of data lines, and a plurality of pixel electrodes, and an upper substrate of the two substrates may include a common electrode. The liquid crystal layer including liquid crystal molecules is disposed between the lower substrate and the upper substrate.

The liquid crystal molecules are configured by the electric field generated by the pixel electrode and the common electrode to control the amount of the light passing through the liquid crystal layer. However, when an electric field, other than the electric field generated by the pixel electrode and the common electrode, is applied to the liquid crystal layer, the liquid crystal molecules may become misaligned in undesired directions, thereby causing light leakage in the LCD.

The above information disclosed in this Background section is only for enhancement of understanding of the background of the invention and therefore may contain information that does not form the prior art that is already known to a person of ordinary skill in the art.

SUMMARY

Exemplary embodiments of the invention provide a liquid crystal display capable of reducing light leakage, and a method of manufacturing the same.

Additional features of the invention will be set forth in the description which follows, and in part will be apparent from the description, or may be learned by practice of the invention.

Exemplary embodiments of the present invention disclose a liquid crystal display. The liquid crystal display includes a first base substrate, a pixel disposed on the first base substrate in a display area of the liquid crystal display, a second base substrate, a common electrode disposed on the second base substrate, a liquid crystal layer disposed between the first base substrate and the second base substrate, and an electric field control line disposed on the first base substrate in anon-display area of the liquid crystal display. The electric field control line is disposed on the same layer as the pixel electrode.

Exemplary embodiments of the present invention disclose a method of manufacturing a liquid crystal display. The method includes forming a first dam on a first base substrate, forming an electric field control line on the first dam, forming a pixel electrode on the first base substrate, forming a first preliminary alignment layer on the pixel electrode, forming a common electrode on a second base substrate, forming a second preliminary alignment layer on the common electrode, forming a liquid crystal layer between the first base substrate and the second base substrate, receiving a voltage at the electric field control line, the pixel electrode, and the common electrode, and forming a first alignment layer and a second alignment layer by applying electromagnetic radiation to the liquid crystal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
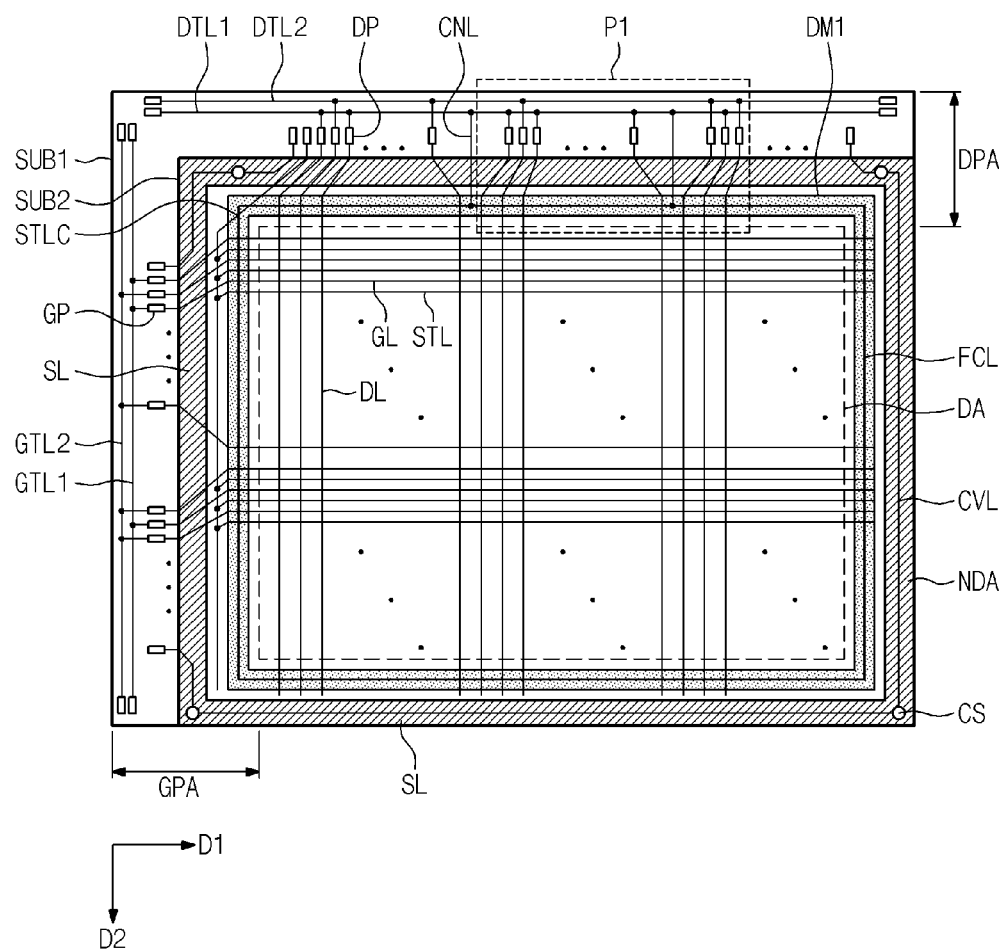
FIG. 1 is a plan view showing a liquid crystal display according to exemplary embodiments of the invention.

Exemplary embodiments of the invention are described more fully hereinafter with reference to the accompanying drawings. The invention may, however, be embodied in many different forms and should not be construed as limited to the exemplary embodiments set forth herein. Rather, the exemplary embodiments are provided so that this disclosure is thorough and complete, and will convey the scope of the invention to those skilled in the art. In the drawings, the size and relative sizes of layers and regions may be exaggerated for clarity.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer or section discussed below could be termed a second element, component, region, layer, or section without departing from the teachings of the present invention. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be explained in detail with reference to the accompanying drawings.

Figure 2:
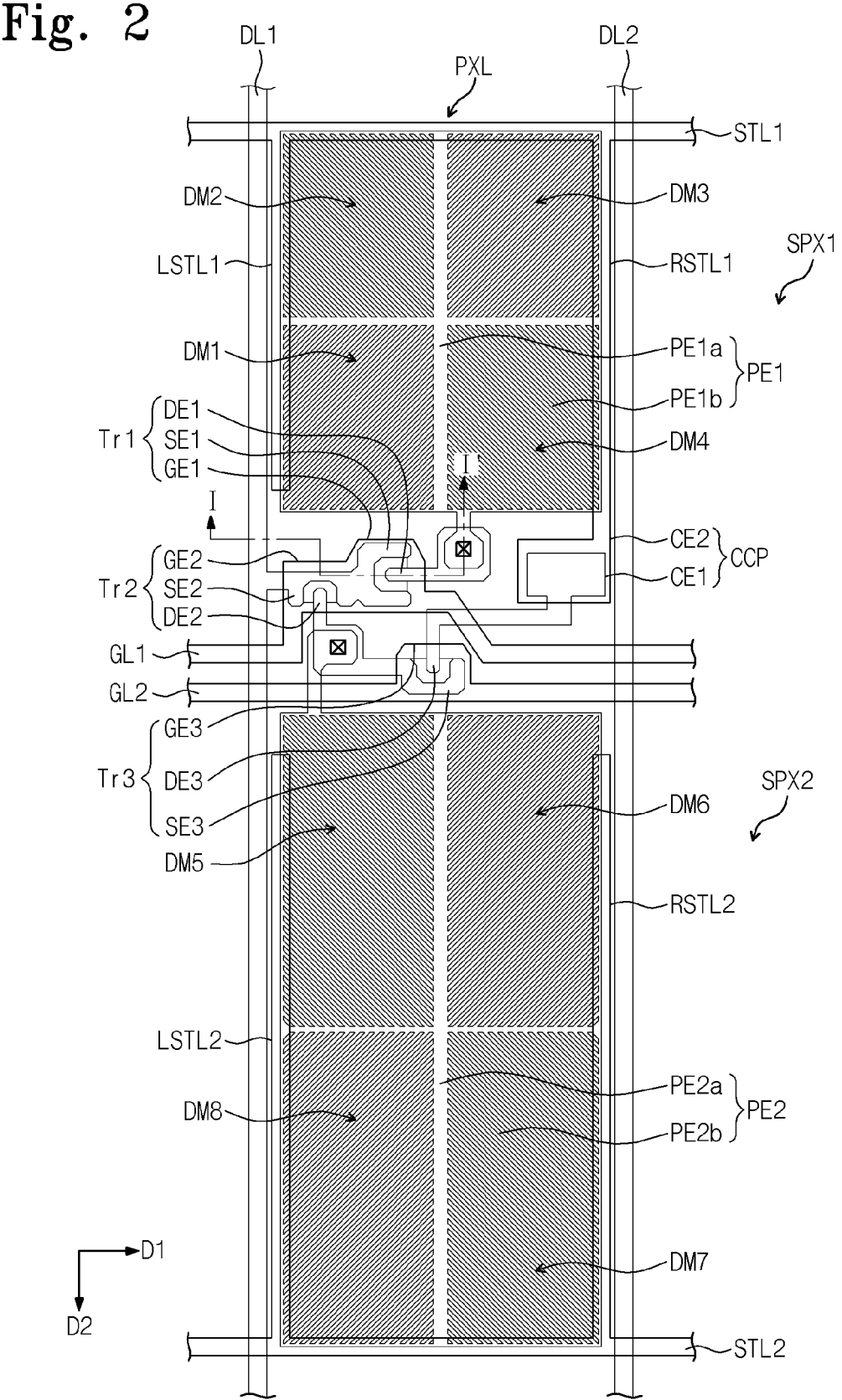
FIG. 2 is a plan view showing one pixel of the liquid crystal display in FIG. 1 according to exemplary embodiments of the invention.
Figure 3:
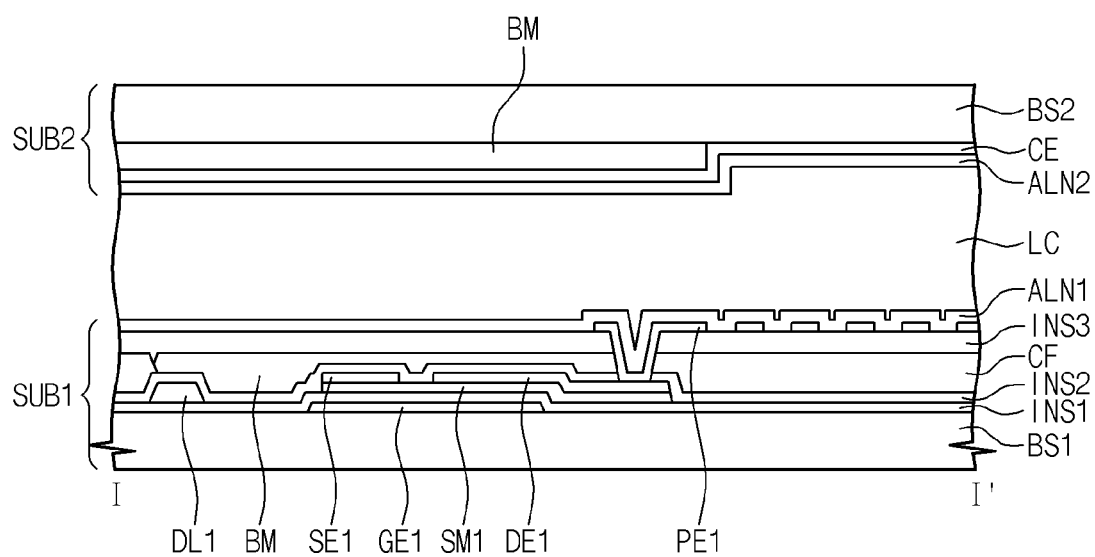
FIG. 3 is a cross-sectional view taken along a line I-I' of FIG. 2 according to exemplary embodiments of the invention.
Figure 4:
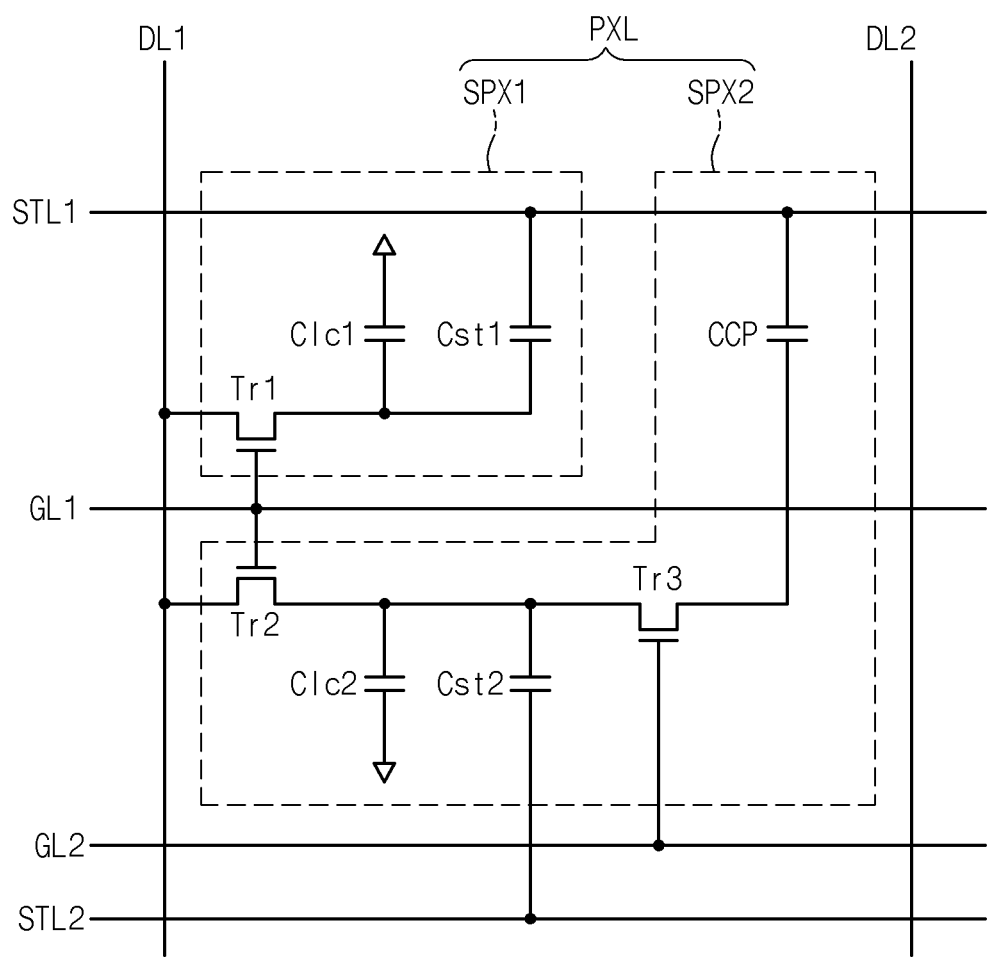
FIG. 4 is an equivalent circuit diagram showing the pixel shown in FIG. 2 according to exemplary embodiments of the invention.

FIG. 1 is a plan view showing a LCD according to exemplary embodiments of the invention. FIG. 2 is a plan view showing one pixel of the LCD shown in FIG. 1. FIG. 3 is a cross-sectional view taken along a line I-I' of FIG. 2. FIG. 4 is an equivalent circuit diagram showing the pixel shown in FIG. 2.

Referring to FIGS. 1, 2, 3, and 4, the LCD includes a first substrate SUB1, a second substrate SUB2 facing the first substrate SUB1, and a liquid crystal layer LC interposed between the first substrate SUB1 and the second substrate SUB2. The LCD includes a display area DA in which an image is displayed and a non-display area NDA surrounding the display area DA.

The first substrate SUB1 includes a first base substrate BS1, a line part disposed on the first base substrate BS1, a plurality of pixels PXL connected to the line part, and a first alignment layer ALN1. The pixels are arranged in the display area DA.

The line part includes a plurality of gate lines GL, a plurality of data lines DL, a plurality of storage lines STL, a common voltage line CVL, and an electric field control line FCL.

The gate lines GL are extended in a first direction D1 and the data lines DL are extended in a second direction D2 crossing the first direction D1.

The storage line STL is extended in the same direction as the gate lines GL, i.e., the first direction D1.

The common voltage line CVL is disposed at, at least a side of the display area DA.

The electric field control line FCL is disposed in the non-display area NDA along at least a portion of the display area DA. The electric field control line FCL is used to generate additional electric field in cooperation with the common electrode CE when the liquid crystal display is manufactured. The electric field control line FCL will be described below in further detail.

Each of the pixels PXL may have the same structure and function. For the convenience of explanation, only one pixel PXL will be described. A pixel PXL may be outlined by two gate lines adjacent to each other and two data line adjacent to each other. Hereinafter, the two gate lines will be referred to as first gate line GL1 and second gate line GL2, respectively, and the two data lines will be referred to as first data line DL1 and second data line DL2, respectively.

The first gate line GL1 and the second gate line GL2 may be disposed on the first base substrate BS1 and may extend in the first direction D1, such that the first gate line GL1 and the second gate line GL2 are substantially parallel to each other. The first data line DL1 and the second data line DL2 are extended in the second direction D2, and may be substantially in parallel to each other. A first insulating layer INS1 is disposed between the first gate line GL1 and the second gate line GL2 and the first data line DL1 and the second data line DL2. The storage lines STL are disposed on the same layer as the gate lines GL and are spaced apart from each other at regular intervals. Each pair of gate lines GL1 and GL2 may be disposed between adjacent storage lines STL.

Each pixel PXL includes a first sub-pixel SPX1 and a second sub-pixel SPX2. The first sub-pixel SPX1 includes a first thin film transistor Tr1, a first pixel electrode PE1, and a first storage electrode part. The second sub-pixel SPX2 includes a second thin film transistor Tr2, a second storage electrode part, a third thin film transistor Tr1, a second pixel electrode PE2, and a coupling capacitor electrode CE1. The first and second sub-pixels SPX1 and SPX2 are disposed between the first data line DL1 and the second data line DL2, which are adjacent to each other.

The first thin film transistor Tr1 of the first sub-pixel SPX1 is connected to the first data line DL1 and the first gate line GL1.

The first thin film transistor Tr1 includes a first gate electrode GE1 branched from the first gate line GL1, a first source electrode SE1 branched from the first data line DL1, and a first drain electrode DE1 electrically connected to the first pixel electrode PE1.

The first storage electrode part includes a first storage line STL1 extended in the first direction D1 and first branch electrode LSTL1 and second branch electrode RSTL1 branched from the first storage line STL1 and extended in the second direction D2.

The first pixel electrode PE1 is partially overlapped with the first storage line STL1, the first branch electrodes LSTL1, and the second branch electrode RSTL1 to form a first storage capacitor.

The first pixel electrode PE1 includes a trunk portion PE1a and a plurality of branch portions PE1b extended from the trunk portion PE1a in a radial form.

The trunk portion PE1a may have a cross shape as shown in FIG. 2. The branch portions PE1b are extended in different directions from the trunk portion PE1a. The first pixel electrode PE1 may be divided into plural areas (e.g., domains) by the trunk portion PE1a. For example, the first pixel electrode PE1 may include a first domain DM1, a second domain DM2, a third domain DM3, and a fourth domain DM4. The branch portions PE1b may be adjacent, may extend substantially in parallel to one other, and may be spaced apart from each other in each domain. The branch portions PE1b may be spaced apart from each other by, in some cases, micrometers or, in some cases, nanometers. Due to the above-mentioned structure, liquid crystal molecules of the liquid crystal layer LC may be aligned at a specific azimuth on a plane parallel to the first base substrate BS1.

The second thin film transistor Tr2 includes a second gate electrode GE2 branched from the first gate line GL1, a second source electrode SE2 branched from the first data line DL1, and a first drain electrode DE1 electrically connected to the second pixel electrode PE2.

The second storage electrode part includes a second storage line STL2 extended in the first direction D1 and third branch electrode LSTL2 and fourth branch electrode RSTL2 branched from the second storage line STL2 and extended in the second direction D2.

The second pixel electrode PE2 is partially overlapped with the second storage line STL2 and the third branch electrode LSTL2 and the fourth branch electrode RSTL2 to form a second storage capacitor.

The second pixel electrode PE2 includes a trunk portion PE2a and a plurality of branch portions PE2b extended from the trunk portion PE2a in a radial manner. The trunk portion PE2a may have the cross shape as shown in FIG. 2. The branch portions PE2b are extended in different directions from the trunk portion PE2a. The second pixel electrode PE2 may be divided into plural areas (e.g., domains) by the trunk portion PE2a. For example, the second pixel electrode PE2 may include a fifth domain DM5, a sixth domain DM6, a seventh domain DM7, and an eighth domain DM8. The branch portions PE2b may be adjacent, may extend substantially in parallel to one other, and may be spaced apart from each other in each domain. The branch portions PE2b may be spaced apart from each other by, in some cases, micrometers, or, in some cases, nanometers. Due to the above-mentioned structure, liquid crystal molecules of the liquid crystal layer LC may be aligned at a specific azimuth on a plane parallel to the second base substrate BS2.

The third thin film transistor Tr3 includes a third gate electrode GE3 branched from the second gate line GL2, a third source electrode SE3 extended from the second drain electrode DE2, and a third drain electrode DE3 connected to a coupling capacitor CCP. The coupling capacitor CCP includes the coupling capacitor electrode CE1 and an opposite electrode CE2 extended from the second branch electrode RSTL2 to form the coupling capacitor CCP, but the coupling capacitor CCP may not be limited thereto or thereby.

The first pixel electrode PE1 and the second pixel electrode PE2 form a pixel electrode PE that may be made of any suitable material. For example, the pixel electrode PE may be formed of a transparent conductive oxide, such as indium tin oxide (ITO), indium zinc oxide (IZO), and indium tin zinc oxide (ITZO).

The first alignment layer ALN1 is used to initially align the liquid crystal molecules of the liquid crystal layer LC, and may include a polymer material in which a decomposition, dimerization, or isomerization reaction occurs by radiation of an electromagnetic wave, e.g., an ultraviolet ray or light from a laser. In addition, the first alignment layer ALN1 may include a polymer polymerized with reactive mesogen.

For instance, the first alignment layer ALN1 may include a polymer obtained by polymerization of a reactive mesogen. The reactive mesogen may be at least one of an alkylated vinyl group having an aliphatic alkyl group with a carbon number of 1 to 18 or an alkylated cinnamoyl group having the aliphatic alkyl group with a carbon number of 1 to 18.

As an example, the reactive mesogen may be at least one of

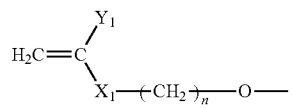

(where n is 1 to 18, $X_1$ is an alkyl group, an ether group (—O—), or an ester group (—COO—), $Y_1$ is a methyl group or hydrogen) or

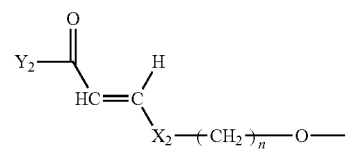

(where n is 1 to 18, $X_2$ is a methyl group, an ether group, an ester group, a phenyl group, a cyclohexyl group, or a phenylester group, $Y_2$ is an alkyl group with a carbon number of 1 to 18, a phenyl group, a biphenyl group, a cyclohexyl group, a bicyclohexyl group, or a phenylcyclohexyl group).

Referring to FIGS. 1, 2, 3, and 4, the second substrate SUB2 may include a second base substrate BS2, a black matrix BM, the common electrode CE, and a second alignment layer ALN2.

The black matrix BM is disposed to correspond to the non-display area NDA and a light blocking area of the first substrate SUB1. The light blocking area may be an area in which the data lines DL, the thin film transistors, and the gate lines GL are formed. Since the pixel electrode PE is not formed in the light blocking area, the liquid crystal molecules are not aligned in a region corresponding to the light blocking area and light leakage may occur without a black matrix BM. Thus, the black matrix BM may be disposed in the light blocking area to block the light leakage.

The common electrode CE is disposed on the second base substrate BS2 on which the black matrix BM is disposed. When an electric potential difference is applied to the common electrode CE and the pixel electrode PE, an electric field may be generated. The common electrode CE may be formed of any suitable material. For example, the common electrode CE may be formed of a conductive metal oxide, such as indium tin oxide, indium zinc oxide, and indium tin zinc oxide.

The second alignment layer ALN2 is disposed on the common electrode CE. The second alignment layer ALN2 may be used to initially align liquid crystal molecules of the liquid crystal layer LC and may include a polymer material in which a decomposition, dimerization, or isomerization reaction occurs upon interaction with an electromagnetic radiation, such as light. In addition, the second alignment layer ALN2 may include a polymer polymerized with the reactive mesogen.

The liquid crystal layer LC is disposed between the second alignment layer ALN2 and the first alignment layer ALN1. The liquid crystal molecules of the liquid crystal layer LC may be vertically aligned to the first alignment layer ALN1 and the second alignment layer ALN2 when the electric field does not exist between the pixel electrode PE and the common electrode CE.

When a gate signal is applied to the gate line GL, a thin film transistor connected to the gate line GL may be turned on. A data signal applied to the data line DL may then be applied to the pixel electrode PE through the turned-on thin film transistor. When the data signal is applied to the pixel electrode PE through the turned-on thin film transistor, an electric field may be generated between the pixel electrode PE and the common electrode CE. The liquid crystal molecules of the liquid crystal layer LC are driven and aligned by the electric field generated between the common electrode CE and the pixel electrode PE. Thus, the amount of the light passing through the liquid crystal layer LC is changed, and the desired image may be displayed.

The non-display area NDA may be disposed adjacent to at least one side of the display area DA.

Figure 5:
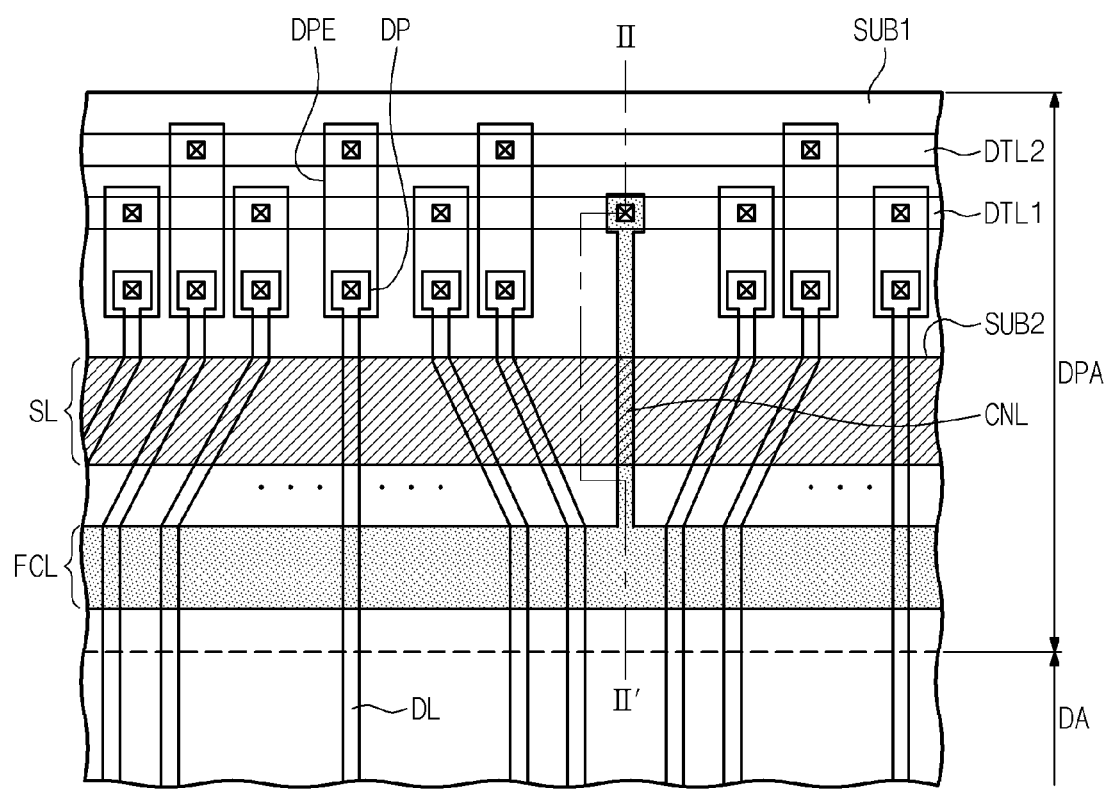
FIG. 5 is an enlarged plan view showing a portion P1 of FIG. 1 according to exemplary embodiments of the invention.
Figure 6:
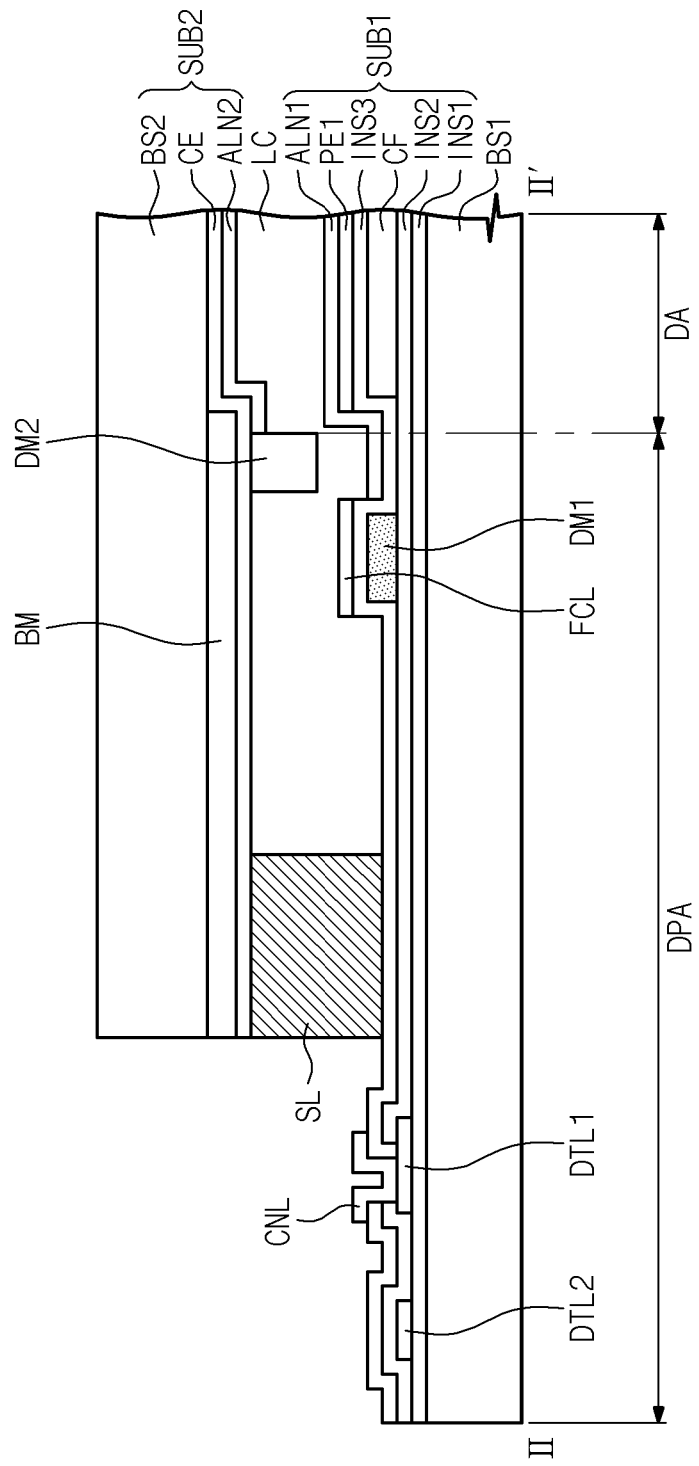
FIG. 6 is a cross-sectional view taken along a line II-II' of FIG. 5 according to exemplary embodiments of the invention.

FIG. 5 is an enlarged plan view showing a portion P1 of FIG. 1, and FIG. 6 is a cross-sectional view taken along a line II-II' of FIG. 5. Hereinafter, the non-display area NDA will be described in detail with reference to FIGS. 1, 5, and 6.

The non-display area NDA includes a pad area in which one end portions of the data lines DL and the gate lines GL are disposed.

The non-display area NDA includes a data pad area DPA in which the one end portions of the data lines DL are disposed and a gate pad area GPA in which the one end portions of the gate lines GL are disposed.

The electric field control line FCL, a test line, and a driver (not shown) may be provided in the pad area.

The electric field control line FCL may be provided along the end portion of the display area DA.

The electric field control line FCL may be used to generate an electric field between the common electrode CE and the electric field control line FCL in response to an applied voltage when the liquid crystal display is manufactured. The electric field control line FCL may be floated after the LCD is completely manufactured. The electric field control line FCL may prevent an undesired electric field, e.g., a lateral electric field, from being generated at the end portion of the display area DA when the first and second alignment layers ALN1 and ALN2 are formed. The undesired electric field may be generated in an area of the non-display area NDA, which is adjacent to the pixel electrode disposed at the outermost position of the display area DA. When the undesired electric field is generated, the liquid crystal molecules may consequently be initially misaligned. Accordingly, light leakage may occur due to the misalignment of the liquid crystal molecules corresponding to the pixels disposed in the end portion of the display area DA. However, the electric field control line FCL adjacent to the end portion of the display area DA may generate an electric field between the common electrode CE and the electric field control line FCL. In some cases, the electric field between the common electrode CE and the electric field control line FCL may be controlled by applying the necessary voltage on the electric field control line FCL. The electric field between the common electrode CE and the electric field control line FCL may thus be adjusted to align the liquid crystal molecules as desired. In some cases, the electric field between the common electrode CE and the electric field control line FCL may be substantially the same as the electric field generated between the pixel electrode and the common electrode CE, thereby preventing the liquid crystal molecules from being misaligned.

The test line is used to test whether defects exist in the gate lines GL and/or the data lines DL, e.g., open of the gate lines GL and the data lines DL. The test line may include a gate test line connected to the gate lines GL and a data test line connected to the data lines DL. The gate test line includes a first gate test line GTL1 and a second gate test line GTL2, which are alternately connected to the gate lines GL. The data test line includes a first data test line DTL1 and a second data test line DTL2, which are alternately connected to the data lines DL. The test lines are connected to the one end portions of the gate lines GL and the one end portions of the data lines DL, but they should not be limited thereto or thereby. For example, in some cases, the test lines may be connected to other one end portions of the gate lines GL and other one end portions of the data lines DL. In some cases, the test lines may be partially omitted.

The test line may be electrically connected to the electric field control line FCL. A connection line CNL is disposed between the test line and the electric field control line FCL to connect the test line and the electric field control line FCL. In some cases, a plurality of test lines may be formed, and at least one of the test lines may be connected to the electric field control line FCL. The electric field control line FCL may receive a voltage from at least one of the test lines and may generate an electric field together with the common electrode CE.

The driver may include a data driver (not shown) disposed in the data pad area DPA and a gate driver (not shown) disposed in the gate pad area GPA.

The data driver is connected to the one end portions of the data lines DL in the data pad area DPA. Data pads DP are disposed at the one end portions of the data lines DL to be connected to external lines. The data driver is electrically connected to the data pads DP to apply the data signals to the data lines DL. The data driver may be arranged along a long side of the LCD and may be provided in a plural number.

The gate driver is connected to the one end portions of the gate lines GL in the gate pad area GPA. Gate pads GP are disposed at the one end portions of the gate lines GL to be connected to external lines. The gate driver may sequentially apply the gate signals to the gate pads to sequentially scan the pixels arranged in plural rows along a short side of the LCD. The gate driver may be arranged along the short side of the LCD and may be provided in a plural number.

In some cases, the gate driver may include a plurality of thin film transistors, e.g., plural amorphous silicon transistors, and may be directly formed on the first substrate SUB1 through a thin film process. In such cases, the gate pad area GPA may be omitted and the gate driver may be directly and electrically connected to the gate lines GL. In some cases, the data driver may include a plurality of thin film transistors, and may be directly formed on the first substrate SUB1 through a thin film process. In such cases, the data pad area DPA may be omitted and the data driver may be directly and electrically connected to the data lines DL.

Further, a storage connection line STLC is disposed in the non-display area NDA. The storage connection line STLC is branched from the data driver and connects the storage lines STL to each other. The storage connection line STLC is extended in the second direction D2 to connect one end portions of the storage lines STL to each other. In some cases, the storage connection line STLC may be added to connect the other end portions of the storage lines STL to each other. The storage connection line STLC may receive a storage voltage Vst from an external source (not shown) and may apply the storage voltage Vst to the storage lines STL.

In the non-display area NDA, a connection part CS and a sealing part SL are disposed between the first substrate SUB1 and the second substrate SUB2. The connection part CS connects the common voltage line and the common electrode CE, and the sealing part SL seals the liquid crystal layer LC between the first substrate SUB1 and the second substrate SUB2.

The sealing part SL includes an organic polymer. The sealing part SL is disposed along an edge of the first substrate SUB1 to surround the liquid crystal layer LC.

The connection part CS may directly contact the common electrode CE and the common voltage line CVL, so that the common voltage line CVL is electrically connected to the common electrode CE. The connection part CS may overlap with the common electrode CE and may have a conductive spacer shape. The conductive spacer is disposed between the common voltage line CVL and the common electrode CE to electrically connect the common voltage line CVL and the common electrode CE. Therefore, the common voltage Vcom applied to the common voltage line CVL is applied to the common electrode CE through the connection part CS. However, the connection part CS may be connected to the common voltage line CVL in various suitable ways. For instance, the connection part CS may be connected to the common voltage line CVL through a silver dot.

The sealing part SL is disposed between the first substrate SUB1 and the second substrate SUB2 to seal the liquid crystal layer LC. The sealing part SL is disposed in the non-display area NDA along an edge of the second substrate SUB2 to prevent leakage of the liquid crystal layer LC. The sealing part SL may overlap with a portion of the common voltage line CVL and a portion of the connection part CS.

Hereinafter, the first substrate SUB1 will be described in detail with reference to FIGS. 2 and 6.

The first base substrate BS1 may have a rectangular shape and may be formed of a transparent insulating material. However, it should be understood that the first base substrate BS1 may have various suitable shapes and may be formed of various suitable materials.

A gate line part is disposed on the first base substrate SUB1. The gate line part includes the first gate line GL1, the second gate line GL2, the first gate electrode GE1, the second gate electrode GE2, the third gate electrode GE3, the first storage line STL1, and the second storage line STL2.

The first insulating layer INS1 is disposed on the entire surface of the first base substrate SUB1 to cover the gate line part.

First semiconductor layer SM1, second semiconductor layer SM2, and third semiconductor layer SM3 are disposed on the first insulating layer INS1 respectively corresponding to the first gate electrode GE1, the second gate electrode GE2, and the third gate electrode GE3.

A data line part is disposed on the first insulating layer INS1 on which the first semiconductor layer SM1, the second semiconductor layer SM2, and the third semiconductor layer SM3 are formed. The data line part includes the first data line DL1, the second data line DL2, the first source electrode SE1, the second source electrode SE2, and the third source electrode SE3, the first drain electrode DE1, the second drain electrode DE2, and the third drain electrode DE3. The first source electrode SE1 and the first drain electrode DE1 are spaced apart from each other, and the first semiconductor layer SM1 may be interposed therebetween. The second source electrode SE2 and the second drain electrode DE2 are spaced apart from each other, and the second semiconductor layer SM2 may be interposed therebetween. The third source electrode SE3 and the third drain electrode DE3 are spaced apart from each other, and the third semiconductor layer SM3 may be interposed therebetween.

A second insulating layer INS2 is disposed on the first data line DL1, the second data line DL2, the first source electrode SE1, the second source electrode SE2, the third source electrode SE3, the first drain electrode DE1, the second drain electrode DE2, and the third drain electrode DE3.

A color filter CF and a first dam DM1 are disposed on the second insulating layer INS2.

The color filter CF is disposed in the display area DA. The color filter CF may include a red color filter, a green color filter, and/or a blue color filter to display color images, however colors of the color filter CF are not limited thereto or thereby. For example, the color filter CF may include a white, cyan, yellow, or magenta filter. The color filter CF is disposed on the first substrate SUB1, but is limited thereto or thereby. For example, in some cases, the color filter CF may be disposed on the second substrate SUB2 rather than the first substrate SUB1.

The first dam DM1 is disposed in the non-display area NDA and extends along the end portion of the display area DA. The first dam DM1 may prevent the first alignment layer ALN1 from overflowing over the end portion of the first base substrate BS1 when the first alignment layer ALN1 is formed. The first dam DM1 is formed to surround the display area DA, but is not limited thereto or thereby. For example, in some cases, the first dam DM1 may be partially opened. A plurality of first dams DM1 may be disposed, and a first dam DM1 disposed on the second insulating layer INS2 is shown in FIG. 6.

The first dam DM1 may be formed of the same material and process used to form the color filter CF. In some cases, the first dam DM1 may have the same thickness as the color filter CF. In some cases, the first dam DM1 may be formed of the same material and process as a blue color filter.

A third insulating layer INS3 is disposed on the color filter CF and the first dam DM1. In some cases, the third insulating layer INS3 may be omitted.

When the third insulating layer INS3 is disposed, the first pixel electrode PE1, the second pixel electrode PE2, and the electric field control line FCL are disposed on the third insulating layer INS3.

The first pixel electrodes PE1 and the second pixel electrode PE2 are respectively connected to the first drain electrode DE1 and the second drain electrode DE2 through contact holes respectively exposing portions of the first drain electrode DE1 and the second drain electrode DE2. The electric field control line FCL is disposed on the third insulating layer INS3 to correspond to the first dam DM1. In the case that the third insulating layer INS3 is omitted, the first pixel electrode PE1, the second pixel electrode PE2, and the electric field control line FCL may be disposed on the color filter CF.

The electric field control line FCL may be disposed on the same plane surface as the first pixel electrode PE1 and the second pixel electrode PE2. The electric field control line FCL may have the same height as the first pixel electrode PE1 and the second pixel electrode PE2. In some cases, the electric field control line FCL may have a different height compared to the heights of the first pixel electrode PE1 and the second pixel electrode PE2. The electric field control line FCL may be formed of the same material as the first pixel electrode PE1 and the second pixel electrode PE2.

The first alignment layer ALN1 may be disposed on the first pixel electrode PE1 and the second pixel electrode PE2. The first alignment layer ALN1 is disposed in the display area DA and may be prevented from overflowing into the non-display area NDA by the first dam DM1.

The second base substrate BS2 may have a rectangular shape and may be formed of the transparent insulating material. However, it should be understood that the first base substrate BS1 may have various suitable shapes and may be formed of various suitable materials. In some cases, the second base substrate BS2 may be slightly smaller than the first base substrate BS1.

The black matrix BM is disposed in the non-display area NDA of the second base substrate BS2, and the common electrode CE is disposed on the black matrix BM.

A second dam DM2 is disposed on the common electrode CE in the non-display area NDA. The second dam DM2 is extended along the end portion of the display area DA. The second dam DM2 may prevent the second alignment layer ALN2 from overflowing into the end portion of the non-display area NDA. The second dam DM2 may not overlap with the first dam DM1. Although only one second dam DM2 has been shown in FIG. 6, a plurality of second dams DM2 may be formed. The second alignment layer ALN2 is disposed on the common electrode CE in the display area DA. The second alignment layer ALN2 is disposed in the display area DA and may be prevented from overflowing to the end portion of the non-display area NDA by the second dam DM2.

Figure 7:
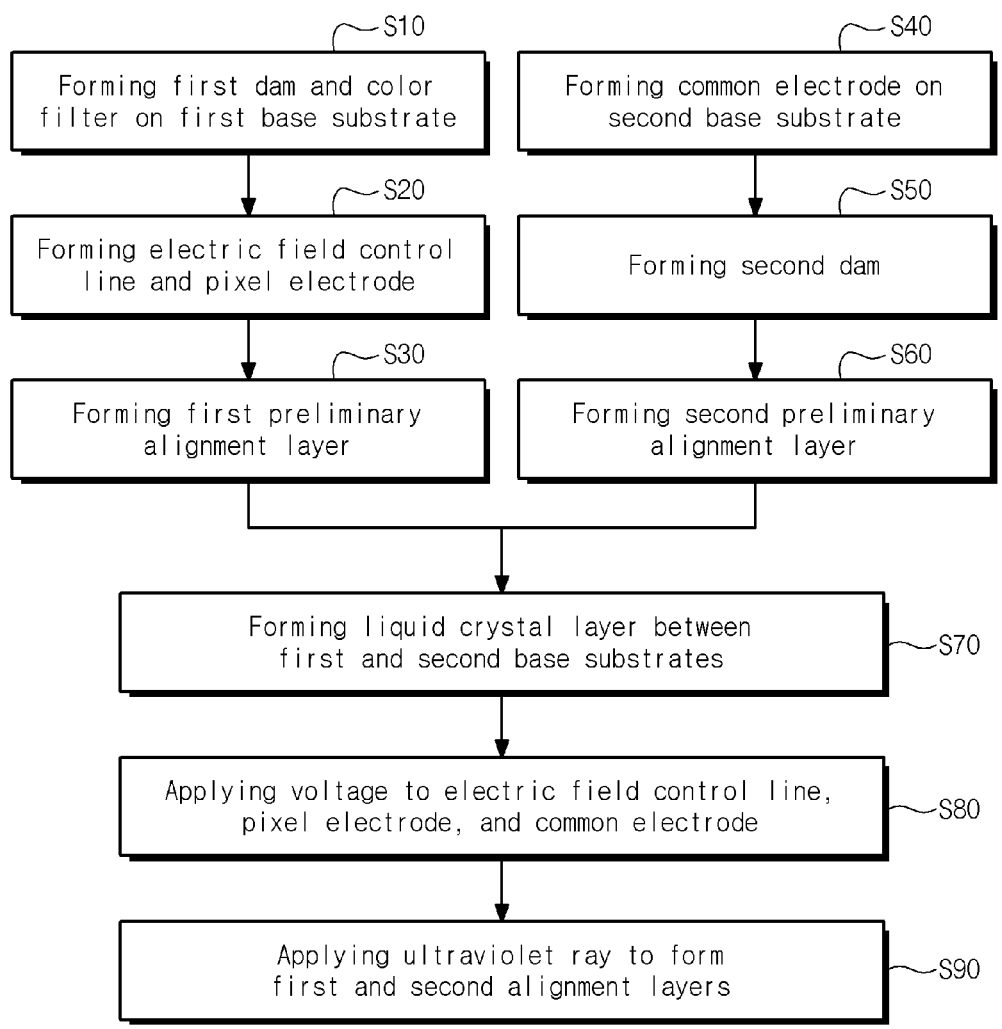
FIG. 7 is a flowchart showing a method of manufacturing a liquid crystal display according to exemplary embodiments of the invention.

FIG. 7 is a flowchart showing a method of manufacturing a LCD according to exemplary embodiments of the invention.

To manufacture the LCD according to exemplary embodiments of the invention, the first dam DM1 and the color filter CF are formed on the first base substrate BS1 (S10). The electric field control line FCL and the pixel electrodes PE1 and PE2 are respectively formed on the first dam DM1 and the color filter CF (S20). A first preliminary alignment layer is formed on the pixel electrodes PE1 and PE2 (S30). Separately, the common electrode CE is formed on the second base substrate BS2 (S40). The second dam DM2 is formed on the second base substrate BS2 (S50), and a second preliminary alignment layer is formed on the second base substrate BS2 (S60). Then, a liquid crystal layer is formed between the first preliminary alignment layer and the second preliminary alignment layer (S70). After that, electric potential (i.e., voltage) is applied to the electric field control line FCL, the pixel electrode PE1 and PE2, and the common electrode CE (S80), and an ultraviolet ray is irradiated to the liquid crystal layer to manufacture the first alignment layer ALN1 and the second alignment layer ALN2 (S90).

Hereinafter, a method of manufacturing the LCD will be described in detail with reference to FIGS. 2, 3, 4, 5, and 6.

First, a method of forming the first dam DM1 and the color filter CF on the first base substrate BS1 will be described.

The gate line part is formed on the first base substrate BS1. The gate line part may be formed by a photolithography process.

The first insulating layer INS1 is formed on the gate line part.

The first semiconductor layer SM1, the second semiconductor layer SM2, and the third semiconductor layer SM3 are formed on the first insulating layer INS1. The first semiconductor layer SM1, the second semiconductor layer SM2, and the third semiconductor layer SM3 may be formed using a photolithography process.

The data line part is formed on the first semiconductor layer SM1, the second semiconductor layer SM2, and the third semiconductor layer SM3. The data line part may be formed by a photolithography process. In some cases, the first semiconductor layer SM1, the second semiconductor layer SM2, and the third semiconductor layer SM3, and the data line part may be formed using one half tone mask or diffraction mask.

The second insulating layer INS2 is formed on the data line part.

The color filter CF and the first dam DM1 are formed on the second insulating layer INS2. The color filter CF may be formed by a photolithography process according to a color of the color filter CF. In some cases, the first dam DM1 may be formed by a photolithography process different from the photolithography process applied to form the color filter CF. In some cases, the first dam DM1 may be formed together with the color filter CF using the same single process. For example, the first dam DM1 may be formed with the blue color filter through the same single process.

The third insulating layer INS3 is formed on the first dam DM1 and the color filter CF.

Contact holes are formed to penetrate through the second insulating layer INS2, the color filter CF, and the third insulating layer INS3 using the photolithography process to expose the portions of the first drain electrode DE1, the second drain electrode DE2, and the third drain electrode DE3.

The first pixel electrode PE1, the second pixel electrode PE2, and the electric field control line FCL are formed on the third insulating layer INS3. The first pixel electrode PE1, the second pixel electrode PE2, and the electric field control line FCL may be formed simultaneously by a photolithography process using a single mask.

The first preliminary alignment layer (not shown) is formed on the first base substrate SUB1 on which the first pixel electrode PE1 and the second pixel electrode PE2 are formed.

The first preliminary alignment layer may be formed by coating an alignment solution containing a polymer (e.g., polyimide, polyamic acid, etc.) or a monomer with a high molecule and heating the alignment solution.

Separately, the black matrix BM is formed on the second base substrate BS. The black matrix BM may be formed in various ways, e.g., a photolithography process. The common electrode CE is formed on the black matrix BM. Then, the second dam DM2 is formed on the common electrode CE. The second dam DM2 may be formed using a photolithography process. After that, the second preliminary alignment layer (not shown) is formed on the second base substrate BS2 on which the common electrode CE is formed.

The second preliminary alignment layer may be formed by coating an alignment solution containing a polymer (e.g., polyimide, polyamic acid, etc.) or a monomer with a high molecule and heating the alignment solution.

Then, the liquid crystal layer LC is disposed between the first base substrate BS1 and the second base substrate BS2. The liquid crystal layer LC includes a liquid crystal composition containing the reactive mesogen. The reactive mesogen may be at least one of an alkylated vinyl group having an aliphatic alkyl group with a carbon number of 1 to 18 or an alkylated cinnamoyl group having the aliphatic alkyl group with a carbon number of 1 to 18. As an example, the reactive mesogen may be at least one of

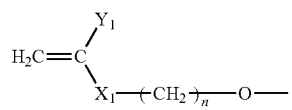

(where n is 1 to 18, $X_1$ is an alkyl group, an ether group (—O—), or an ester group (—COO—), $Y_1$ is a methyl group or hydrogen) or

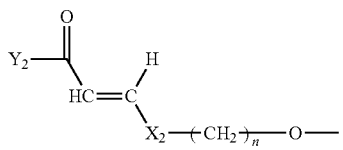

(where n is 1 to 18, $X_2$ is a methyl group, an ether group, an ester group, a phenyl group, a cyclohexyl group, or a phenylester group, $Y_2$ is an alkyl group with a carbon number of 1 to 18, a phenyl group, a biphenyl group, a cyclohexyl group, a bicyclohexyl group, or a phenylcyclohexyl group).

Next, a voltage may be applied to the electric field control line FCL, the first pixel electrode PE1, the second pixel electrode PE2, and the common electrode CE. The electric field control line FCL, the first pixel electrode PE1, and the second pixel electrode PE2 are applied with the same voltage, and the common electrode CE is applied with a different voltage from the voltage applied to the electric field control line FCL, the first pixel electrode PE1, and the second pixel electrode PE2. For instance, the common electrode CE may be applied with a voltage of about 8 volts to about 11 volts, and the electric field control line FCL, the first pixel electrode PE1, and the second pixel electrode PE2 may be grounded.

Thus, the same electric field is generated between the electric field control line FCL and the common electrode CE and between the common electrode CE and the first and second pixel electrodes PE1 and PE2. The electric field control line FCL may prevent the undesired electric field, e.g., the lateral electric field, from being generated at the end portion of the display area DA when the first alignment layer ALN1 and the second alignment layer ALN2 are formed. The liquid crystal molecules of the liquid crystal layer LC are aligned to a specific direction by the electric field. According to exemplary embodiments of the invention, the voltage may be applied easily to the electric field control line FCL through the test line.

The ultraviolet ray is irradiated to the liquid crystal layer LC to cure the reactive mesogen contained in the liquid crystal layer while the electric field is generated between the electric field control line FCL and the common electrode CE and between the common electrode CE and the first and second pixel electrodes PE1 and PE2. When a predetermined time lapses after the ultraviolet ray is irradiated, the reactive mesogens cause the polymerization reaction so as to form a side chain. Thus, the first alignment layer ALN1 and the second alignment layer ALN2 are formed.

In more detail, when the electric field is applied to the liquid crystal molecules, the reactive mesogens may be aligned in the same direction as the liquid crystal molecules disposed adjacent to the reactive mesogens. Accordingly, the electric field control line FCL may prevent an undesired electric field, e.g., the lateral electric field, from being generated at the end portion of the display area DA, and thus the liquid crystal molecules may be prevented from being misaligned. Due to the irradiation of the ultraviolet ray, the reactive mesogens are polymerized with each other, thereby forming a network between the reactive mesogens. For instance, the reactive mesogen may be coupled to an adjacent reactive mesogen to form the side chain. Since the reactive mesogens form the network while the liquid crystal molecules are aligned, the reactive mesogens have a specific directional property in accordance with an average alignment direction of the liquid crystal molecules. Accordingly, although the electric field is removed, the liquid crystal molecules disposed adjacent to the network have a pretilt angle and the pretilt angle is prevented from being non-uniform due to the misalignment of the liquid crystal molecules, thereby reducing light leakage.

In addition, although not shown in drawings, the portion of the first base substrate where the test line is formed may be removed, and the electric field control line may be floated in the resulting liquid crystal display.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first base substrate;
a pixel electrode disposed on the first base substrate in a display area of the liquid crystal display;
a second base substrate;
a common electrode disposed on the second base substrate;
a liquid crystal layer disposed between the first base substrate and the second base substrate;
at least one first dam disposed in a non-display area of the liquid crystal display, the at least one first dam protruding from the first base substrate; and
an electric field control line disposed on the first base substrate in the non-display area of the liquid crystal display,
wherein the electric field control line is disposed on the at least one first dam.

2. The liquid crystal display of claim 1, further comprising:
a first alignment layer disposed on the pixel electrode,
wherein the at least one first dam disposed in the non-display area to correspond to an end portion of the first alignment layer.

3. The liquid crystal display of claim 2, further comprising a color filter disposed on the first base substrate,
wherein the at least one first dam comprises the same material as the color filter.

4. The liquid crystal display of claim 3, wherein:
the color filter comprises at least one of a blue color filter, a green color filter, and a red color filter; and
the first dam comprises the same material as the blue color filter.

5. The liquid crystal display of claim 2, further comprising:
a second alignment layer disposed on the common electrode; and
at least one second dam disposed in the non-display area to correspond to an end portion of the second alignment layer, the at least one second dam protruding from the second base substrate.

6. The liquid crystal display of claim 5, wherein each of the first alignment layer and the second alignment layer comprises a polymerized reactive mesogen.

7. The liquid crystal display of claim 1, further comprising:
a line part disposed on the first base substrate, the line part comprising a plurality of gate lines and a plurality of data lines; and
a switching device electrically connected to the line part and the pixel electrode.

8. The liquid crystal display of claim 7, further comprising at least one test line disposed in the non-display area, the at least one test line configured to test whether a defect exists in at least one of the gate lines or the data lines, wherein the electric field control line is electrically connected to the at least one test line.

9. The liquid crystal display of claim 8, further comprising a connection part to connect the electric field control line and the at least one test line.

10. The liquid crystal display of claim 1, further comprising a black matrix disposed in the non-display area of the second base substrate to block light.

11. The liquid crystal display of claim 1, wherein the electric field control line comprises the same material as the pixel electrode.

12. The liquid crystal display of claim 1, wherein the pixel electrode comprises a trunk portion to define a plurality of domains and a plurality of branch portions extended from the trunk portion and arranged substantially in parallel to each other in each domain.

13. The liquid crystal display of claim 1, wherein the electric field control line is floated.

\* \* \* \* \*